United States Patent

Van Westrenen et al.

[15] 3,669,942

[45] June 13, 1972

[54] COPOLYMERS OF VINYL ESTERS OF BRANCHED ACIDS

[72] Inventors: William J. Van Westrenen; Pieter De Carpentier, both of Delft; Willem H. M. Nieuwenhuis, Amsterdam, all of Netherlands

[73] Assignee: Shell Oil Company, New York, N.Y.

[22] Filed: June 30, 1970

[21] Appl. No.: 51,326

[30] Foreign Application Priority Data

July 3, 1969     Great Britain.......................33,543/69

[52] U.S. Cl..................260/78.5 R, 260/29.4 UA, 260/39 R, 260/78.5 T, 260/80.73, 260/80.75, 260/844, 260/901, 117/93.4 R, 117/132 BF
[51] Int. Cl. ........................................................C08f 15/40
[58] Field of Search............260/80.75, 80.73, 78.5 E, 78.5 R

[56] References Cited

UNITED STATES PATENTS

| 3,287,300 | 11/1966 | Oosterhof et al. | 260/23 |
| 3,294,727 | 12/1966 | Grommers et al. | 260/29.6 |
| 3,455,887 | 7/1969 | Levine | 260/78.5 |

FOREIGN PATENTS OR APPLICATIONS

| 1,087,623 | 10/1967 | England | 260/851 |

*Primary Examiner*—Joseph L. Schofer
*Assistant Examiner*—Stanford M. Levin
*Attorney*—Norris E. Faringer and Martin S. Baer

[57] ABSTRACT

Copolymers of (a) a vinyl ester of an alpha-branched, saturated, aliphatic monocarboxylic acid of five–20 carbon atoms, (b) an alpha,beta-ethylenically unsaturated carboxylic acid of three to five carbon atoms, (c) a monovinylaromatic compound of eight to nine carbon atoms, (d) a 2-hydroxyalkylester or an amide of an alpha,beta-ethylenically unsaturated carboxylic acid and, optionally, (e) a $C_1$–$C_4$ alkyl ester of acrylic or methacrylic acid and their preparation are described. These special copolymers are especially suitable in water-thinnable compositions, particularly in electrodepositable compositions to produce pore-free coatings or films.

11 Claims, No Drawings

COPOLYMERS OF VINYL ESTERS OF BRANCHED ACIDS

BACKGROUND OF THE INVENTION

The use of water-thinnable paint binders and paints is now well established. One of the advantages is that they offer the possibility for electrodeposition from aqueous solution onto metals to form a pore-free coating in thin layers, even at places difficult to reach with spray gun or brush. In order to be suitable as a component in water-thinnable binders, the copolymer must preferably contain carboxyl groups.

SUMMARY OF THE INVENTION

The invention relates to special copolymers of vinyl esters which can be used as binder components in thermosetting coating compositions, such as in solvent-borne stoving lacquers, and in particular in water-thinnable compositions.

Accordingly, the invention provides a special copolymer which is obtained by copolymerizing in one or more stages a mixture of ethylenically unsaturated compounds consisting of:

a. 20–80 percent by weight of a vinyl ester of saturated aliphatic monocarboxylic acids having from five–20 carbon atoms per molecule and in which carboxylic acids the carboxyl group is attached direct to a tertiary or quaternary carbon atom, i.e., alpha-branched, b. 2–20 percent by weight of an alpha, beta-ethylenically unsaturated carboxylic acid having three to five carbon atoms per molecule, c. 5–40 percent by weight of a monovinylaromatic compound, having eight to nine carbon atoms per molecule, d. 5–35 percent by weight of a 2-hydroxyalkylester or an amide of an alpha, beta-ethylenically unsaturated carboxylic acid, and, optionally, e. 0–25 percent by weight of a $C_1$ to $C_4$ alkylester of acrylic or methacrylic acid.

DESCRIPTION OF THE PREFERRED EMBODIMENT

For convenience in this specification the term "present copolymer" shall mean the copolymer obtained by copolymerizing components (a), (b), (c), (d) and, optionally, (e). The present copolymers have an average molecular weight of more than 1,000 and the term includes copolymers with random arrangement of monomer units as well as block copolymers and graft copolymers, and mixed copolymers.

The main structural units in the present copolymers are:

(a) 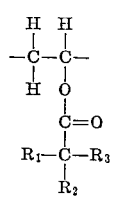

wherein $R_1$ is hydrogen or an alkyl group, and $R_2$ and $R_3$ are alkyl groups or together with the central carbon atom form a cycloalkyl group.

(b) 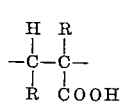

wherein each R separately is hydrogen, methyl, or a carboxyl group.

(c) 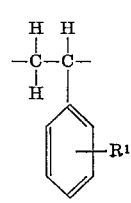

wherein $R^1$ is hydrogen or methyl.

(d) 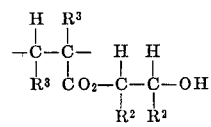

wherein each $R^2$ separately is hydrogen, methyl or ethyl, and each $R^3$ separately is hydrogen, methyl, carboxyl or 2-hydroxyalkyl, and, optionally, (e) 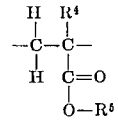

wherein $R^4$ is hydrogen or methyl, and $R^5$ is a $C_1$ to $C_4$.

Aqueous coating compositions containing the present copolymers have good hydrolytic stability, and yield, when applied by electrodeposition and stoved, films which have good gloss, appearance, flexibility and excellent chemical resistance.

The binder is usually prepared by neutralizing the copolymer completely or partially with an alkaline material, such as a nitrogen base.

For convenience the saturated aliphatic monocarboxylic acids in which the carboxylic group is attached direct to a tertiary or quaternary carbon will hereinafter be referred to as "-branched monocarboxylic acids" or as "alpha-branched monocarboxylic acids" and the vinyl esters thereof as "vinyl esters of branched monocarboxylic acids". "Aliphatic" as used herein includes acyclic aliphatic as well as cycloaliphatic.

For the preparation of the present copolymers, component (a) is preferably a vinyl ester of alpha-branched monocarboxylic acids having from nine–11, or more specifically 10, carbon atoms per molecule.

The branched monocarboxylic acids can very suitably be obtained by reacting formic acid or carbon monoxide and water with olefins under the influence of liquid acid catalysts, such as sulphuric acid, phosphoric acid or complexes of phosphoric acid, borontrifuoride and water. As olefins in such processes, mixtures of olefins obtained by cracking paraffinic hydrocarbons, for example mineral oil fractions, may be used. These mixtures may contain branched as well as straight chain acyclic olefins and also cyclo-aliphatic olefins. When such mixtures are reacted with formic acid or with carbon monoxide and water, a mixture of saturated acyclic and cycloaliphatic monocarboxylic acids is obtained in which the carboxyl group is predominantly attached to a quaternary carbon atom. Other olefinic starting materials are, for example, isobutylene, propylene trimer, and diisobutylene.

The preparation of suitable alpha-branched, saturated, monocarboxylic acids and their respective vinyl esters is well known. See, for example, U.S. Pat. Nos. 3,287,300 and 3,294,727.

The alpha, beta-ethylenically unsaturated carboxylic acids used as component (b) are preferably monocarboxylic acids, and more preferably acrylic acid or methacrylic acid, but di- or polyvalent carboxylic acids are also included. Examples of di- or polyvalent alpha, beta-ethylenically unsaturated carboxylic acids are maleic acid and fumaric acid and also di- or polyvalent propenecarboxylic acids such as, e.g., itaconic acid and aconitic acid.

Component (c) is a monovinyl aromatic compound containing from eight to nine carbon atoms per molecule, such as styrene or vinyl toluene.

Component (d) is a 2-hydroxy alkyl ester or an amide of an alpha, beta-ethylenically unsaturated acid, such as 2-hydroxyethyl acrylate, 2-hydroxyethyl methacrylate, 2-hydroxypropyl acrylate, 2-hydroxypropyl methacrylate, mono- and di-2-hydroxyethyl esters of maleic acid and fumaric acid, acrylamide, N-hydroxymethyl acrylamide. Preferred is 2-hydroxyethyl methacrylate.

The optional component (e) is a $C_1 - C_4$ alkyl ester of acrylic or methacrylic acid, and is preferably methyl methacrylate.

The amount of component (a) is preferably 40–70 percent of the total weight of monomers.

Preferred amounts of components (b) and (c) are each 5–25 percent by weight.

Very suitable copolymers for use in water-thinnable binders are obtained by copolymerizing 40–60 percent by weight of component (a), 4–10 percent by weight of component (b), 10–30 percent by weight of component (c), 5–20 percent by weight of component (d) and 10–25 percent by weight of component (e).

Other preferred copolymers are obtained by copolymerizing 45–65 percent by weight of component (a), 4–10 percent by weight of component (b), 5–30 percent by weight of component (c), and 10–30 percent by weight of component (d).

The present copolymers can be produced by methods generally known in the art. The polymerization may be performed either without any diluent or in solution, suspension or emulsion.

Preferably, the polymerization is carried out in a solvent in which the monomers are soluble. Suitable solvents are, among others, butanol, isopropanol, monomethyl ether of ethylene glycol, butyl acetate, ethyl acetate, benzyl alcohol, cyclohexanon, or isophorone, and the hydrocarbons cyclohexane and xylene. A very suitable solvent for the polymerization proved to be a 1:2 weight ratio blend of butyl OXITOL and benzyl alcohol, as it noticeably improves flow of coatings on stoving and gloss of the stoved film. For the polymerization, a peroxide catalyst is generally utilized. Suitable catalysts for this purpose are, among others, di-tertiary butyl peroxide and benzoyl peroxide. The amount of catalyst that may be utilized may be varied considerably; however, in most cases, it is desirable to use a quantity of catalyst that is from 0.1 to 5.0 percent by weight of the amount of monomer to be polymerized.

The reaction temperature chosen depends on the catalyst selected and is generally between 50° and 150° C. In many cases a reaction temperature is chosen at which the reaction mixture just boils.

For preparing the present copolymers, a process is preferred in which a reactor is charged with the total amount of component (a) and with from 5 to 15 percent by weight of the other ethylenically unsaturated monomers, whereafter, under polymerization conditions, the remainder of components (b), (c), (d) and, optionally, (e) is added gradually in one or more stages. For preparing five component copolymers the remainder of the components (b), (c), (d), and (e) may be added gradually in one stage, for example, if the catalyst is benzoyl peroxide at a polymerization temperature of from 75° to 130° C, the remainder may be added in one mixture at a constant rate in 10–15 hours. For preparing four component copolymers from components (a), (b), (c), and (d), preference is given to a process in which the remainder of components (b), (c), and (d) is added in two stages, for example a first stage in which 70–90 percent by weight of components (b) and (d) plus the total of the remainder of component (c) is added gradually, and a second stage in which the remaining amount of components (b) and (d) is added gradually. Another preferred process comprises charging the reactor with the total amount of components (a) and (c) and with from 0–15 wt.-% of the other monomers, and then adding gradually under polymerization conditions the remainder of components (b), (d), and, optionally, (e) in one or more stages.

Staged additions as hereinbefore described are believed to promote copolymerization and to reduce homopolymerization of individual components. Monomer components (a) and (c) hardly, if at all, copolymerize because the polymerization rates are widely different; however, if components (b), (d), and, optionally, (e) are present, virtually complete copolymerization can be directed by proper selection of polymerization technique, such as staging as hereinbefore described.

The present copolymers can be used in thermosetting paint and lacquer formulations, in combination with formaldehyde condensation products such as urea-formaldhyde resins and melamine-formaldehyde resins. Dissolved or dispersed in volatile organic liquids such formulations can be applied by spray, brush, or roller, or by dipping.

Copolymers according to the invention which contain in the molecule the equivalent of 4–10 percent by weight of component (b) can be made water-soluble for use in binders by neutralizing wholly or partly with an alkaline material, such as a nitrogen base, e.g., ammonium hydroxide or triethylamine, and further dilution with water. Such aqueous solutions can be mixed, if desired, with formaldehyde-condensation products, such as the low-reactive butylated formaldehyde-melamine resin CIBAMIN M 96, for use in electrodeposition paints. The film properties of electrodeposition finishes formulated from binders on base of the present copolymers are excellent.

The superior performance of the present copolymers in thermosetting surface coating compositions is attributed to the proper choice of monomer components and their weight ratios, in particular to the use of vinyl aromatic compounds [component(c)] in conjunction with the other types of components. For example, it was found that copolymers as described in Example I but without styrene were inhomogeneous, and that paint films based on them were heterogeneous and locally sticky.

Further, there is improvement in performance over the copolymers of British Pat. No. 1,087,623, which have been obtained by copolymerizing a mixture consisting of a VERSATIC acid 911 vinyl ester which is a vinyl ester of alpha-branched saturated monocarboxylic acids as hereinbefore defined, an alpha, beta-ethylenically unsaturated carboxylic acid, methyl methacrylate, a $C_4$–$C_{18}$ alkyl acrylate, and a hydroxyalkyl ester of an alpha, beta-ethylenically unsaturated carboxylic acid, all as more particularly described therein, also with respect to the weight ratios of the monomer components. It has been found that in comparative compositions, optimalized both with regard to hardness and flexibility of stoved coatings, the copolymers of the present invention offer advantages, in particular in electrodeposition paints, with regard to chemical resistance and solvent resistance, as demonstrated by a comparative example below.

The invention is illustrated by the following examples. Parts and percentages therein are by weight, unless otherwise indicated. Example II is a comparative example.

EXAMPLE I

The present copolymer (to be referred to hereinafter as "copolymer A") was prepared from the following monomer composition:

| Type of Monomer | Parts by Weight |
| --- | --- |
| Mixture of vinyl esters of saturated aliphatic monocarboxylic acids having 9–11 C-atoms and branched at the alpha-C-atom (VEOVA 911) | 50.0 |
| Acrylic acid | 6.6 |
| Styrene | 16.0 |
| 2-hydroxyethyl methacrylate | 10.3 |
| Methyl methacrylate | 17.1 |

A glass reactor of 1 liter, fitted with stirrer, thermometer, condenser, nitrogen inlet tube and connected via glass tubes to a metering pump, was charged with 200 g of VEOVA 911 to which 1 g of di-tertiary butyl peroxide was added, and 37.4 g of a comonomer mixture which had the following composition:

| | |
| --- | --- |
| Acrylic acid | 26.4 g |
| 2-hydroxyethyl methacrylate | 41.2 g |
| Methyl Methacrylate | 68.4 g |
| Styrene | 64.0 g |
| Solvent | 170.0 g |
| Benzoyl peroxide | 4.0 g |

The solvent was a 1:2 weight ratio blend of ethylene glycol butyl ether and benzyl alcohol.

The reactor charge was heated to 80° C. while continuously stirring the reactor charge and leading nitrogen over the reactor content at a rate of 0.36 l/min. At 80° C. the remaining comonomer mixture (336.6 g) was pumped into the reactor at a constant rate in 12 hours. The temperature was increased from 80° C. to 115° C. within half an hour. For controlling exothermic reaction, cooling means are applied.

After the addition of all comonomers 1.5 g of benzoyl peroxide (50 wt.-% paste in phthalate plasticizer) was added and the heating was continued for 2 hours. This procedure was repeated three times.

A polymer solution was obtained of which the solids content was 67 wt.-% and the acid value 37.8 mg KOH/g solution. An aqueous solution of polymer and melamine formaldehyde resin (the binder solution) was prepared by blending consecutively:

| | |
|---|---|
| 191.5 g | polymer solution prepared as above (67% solids) |
| 42.8 g | melamine formaldehyde resin (CIBAMIN M 95; 75 wt.-% solids) |
| 7.8 g | triethyl amine |
| 399.5 g | demineralized water. |

The solids content of this binder solution was 25 percent by weight; the polymer/melamine formaldehyde resin ratio was 80/20 wt. In the same way a binder solution in which the polymer/melamine-formaldehyde resin ratio was 87/13 was prepared.

A pigment dispersion was then prepared by ball milling:
55 g rutile titanium dioxide
55 g binder solution
for 17 hours and then adding:
100 g of the binder solution
and further ball milling for another 2 hours.
A paint was then prepared by mixing consecutively:
189 g ball mill compound
460.5 g binder solution
850.5 g demineralized water.
The paint had the following data:
pH      8.3
Specific resistance at 23° C.      1,219 Ωcm
Pigment/binder ratio      0.33 (wt.)
Total binder solids content      10 percent This paint was deposited onto phosphated steel panels in an electrodeposition bath under the following conditions:

| | |
|---|---|
| area coated per panel | 230 cm² |
| temperature of paint | 22° C |
| electrode separation (anode = panel to be coated, cathode = stainless steel panel) | 10 cm |
| Deposition voltage | 100 V constant |
| Deposition time | 2 minutes |
| Deposition final amperage | 0.1 A |

The properties of the paints are given in Table I.

TABLE I

Film Properties of White Electrodeposition Finishes
(Copolymer A)

| Polymer | Copolymer A | copolymer A |
|---|---|---|
| Melamine formaldehyde resin | CIBAMIN M 96 | CIBAMIN M 96 |
| Polymer/melamine formaldehyde resin wt.-ratio in bath | 80/20 | 87/13 |
| Pigment | rutile titanium dioxide | rutile titanium dioxide |
| Pigment/Binder wt.-ratio | 0.33 | 0.33 |
| Deposition conditions | 2 min. 100 V | 2 min. 110 V |
| Film thickness (μ) | 30 | 32 |
| Stoving schedule | 30 min., 150° C | 30 min., 150° C |
| Gloss under 45° (%) | 72 | 65 |
| Appearance | good | good |
| Buchholz hardness | 105 | 105 |
| Minutes to total softening in: | | |
| Acetone | 1 | 1 |
| Methyl isobutyl ketone | 25 | 24 |
| Xylene | 25 | 32 |
| Resistance to | | |
| 5% NaOH 23° C | after 7 days adhesion still very good | after 7 days adhesion good |
| 5% HAc 23° C | after 6 days adhesion good | after 6 days adhesion good |

EXAMPLE II (Comparative Example)

For comparison, a copolymer (to be referred to hereinafter as "copolymer B") was prepared according to British Pat. No. 1,087,623 from monomers in the following weight ratios:

| Type of Monomer | Parts by Weight |
|---|---|
| VEOVA 911 | 26.5 |
| Acrylic acid | 6.0 |
| Butyl acrylate | 25.0 |
| 2-hydroxy ethyl methacrylate | 10.0 |
| Methyl methacrylate | 32.5 |

The polymerization was carried out as described in said British Pat. 1,087,623, with lauryl mercaptan and di-tert.-butyl peroxide as initiator and butyl OXITOL as the solvent. The copolymer was neutralized with triethyl amine, and compounded into a paint substantially as described in Example I for "copolymer A." The properties of the resulting paint are tabulated in Table II.

TABLE II

Film Properties of White Electrodeposition Finishes
(Copolymer B)

| | |
|---|---|
| Polymer | Copolymer B |
| Melamine formaldehyde resin | CIBAMIN M 96 |
| Polymer/melamine formaldehyde resin ratio in bath | 80/20 |
| Pigment | rutile titanium dioxide |
| Pigment/Binder ratio | 0.33 |
| Deposition conditions | 2 minutes 100 V |
| Film thickness (μ) | 26 |
| Stoving schedule | 30 minutes, 150° C |
| Gloss under 45° (%) | 61 |
| Appearance | slight uneven |
| Buchholz hardness | 83 |
| Minutes to total softening in | |
| Acetone | ¼ |
| Methyl isobutyl ketone | ½–1 |
| Xylene | ½–1 |
| Resistance to | |
| 5% NaOH, 23° C | after 5 days total loss of adhesion |
| 5% HAc, 23° C | after 5 days total loss of adhesion |

Comparing the film properties of the white electrodeposition finishes based on the copolymers of Example I with those based on the copolymers of Example II prepared according to British Pat. No. 1,087,623, it will be apparent that the former have better performance, in particular with respect to chemical resistance, solvent resistance and hardness.

EXAMPLE III

The copolymer was prepared from the following monomer composition:

| Type of Monomer | Parts by Weight |
| --- | --- |
| Mixture of vinyl esters of saturated aliphatic monocarboxylic acids having 9–11 C-atoms and branched at the alpha-C-atom (VEOVA 911) | 57.0 |
| Methacrylic acid | 6.9 |
| Styrene | 13.3 |
| 2-hydroxyethyl methacrylate | 22.8 |

A glass reactor of 1 liter, fitted with stirrer, thermometer, condenser, nitrogen inlet tube and connected via glass tubes to a metering pump, was charged with the following mixture:

| | |
| --- | --- |
| VEOVA 911 | 119.7 g |
| Methacrylic acid | 1.4 g |
| Styrene | 2.8 g |
| 2-hydroxyethyl methyl methacrylate | 4.8 g |
| Methyl OXITOL (2-methoxy ethanol) | 30.0 g |
| Tetrahydrofurane | 6.0 g |

The reactor charge was heated to 80° C. with continuous stirring and leading in nitrogen at a rate of 0.36 l/min.

The following mixture was prepared and pumped into the reactor at a constant rate over 18 hours:

| | |
| --- | --- |
| methacrylic acid | 11.6 g |
| Styrene | 25.1 g |
| 2-hydroxyethyl methacrylate | 38.4 g |
| Methyl OXITOL | 37.5 g |
| Tetrahydrofurane | 7.5 g |
| Benzoyl peroxide | 2.4 g |

Fifteen minutes after begin of this addition the temperature was raised from 80° C. to 110° C. in 20 minutes. Throughout the further reaction time the temperature was maintained at 110° C.

A further mixture consisting of

| | |
| --- | --- |
| methacrylic acid | 1.4 g |
| 2-hydroxyethyl methacrylate | 4.8 g |
| methyl OXITOL | 7.5 g |
| tetrahydrofurane | 1.5 g |
| benzoyl peroxide | 0.6 g | was added at a constant rate over 2 hours.

After addition of all comonomers 1.5 g of benzoyl peroxide was added, and the heating was continued for 4 hours.

The polymer solution obtained had a solids content of 69 wt.-% and an acid value of 37.1 mg KOH/g solution.

An aqueous solution of polymer and melamine-formaldehyde resin (the binder solution) was prepared by blending:

| | |
| --- | --- |
| polymer solution prepared as above | 154 g |
| melamine-formaldehyde resin (Cymel XM 1116) | 46 g |
| dimethyl ethanolamine | 8.1 g |
| distilled water | 1331.9 g |

The solids content of this binder solution was 10 percent by weight; the polymer/melamine-formaldehyde resin weight ratio was 70/30. For this and and following calculations solids content or binder content is the sum of the weights of dry copolymer and melamine-formaldehyde resin.

A pigment dispersion was prepared by ball milling during 48 hours:

| | | |
| --- | --- | --- |
| titanium dioxide pigment | 46 | g |
| binder solution | 18.4 | g |
| distilled water | 29 | g |
| dimethyl ethanolamine | 1.0 | g | then adding 30 g of binder solution and further ball milling during 2 hours. The remainder of the binder solution was added, and then distilled water to make the total weight of the paint 2,000 g.

Some typical data of this paint are:

| | |
| --- | --- |
| pH | 8.8 |
| Specific resistance at 25° C | 1211 Ω cm |
| Pigment/binder ratio (wt) | 0.3 |

This paint was deposited onto cold-rolled steel panels in an electrodeposition bath under the following conditions:

| | |
| --- | --- |
| area coated per panel | 150 cm² |
| temperature of paint | 22° C |
| electrode separation | 10 cm |
| deposition voltage | 250 V constant |
| deposition time | 2 minutes |
| deposition final amperage | 0.07 A |

The coated panels were stoved at 175° C. during 30 minutes; the stoved coatings had the following properties:

| | |
| --- | --- |
| Film thickness (μ) | 24 |
| Gloss under 45° (%) | 74 |
| Buchholz hardness | 91 |
| Minutes to total softening in: | |
| Methyl isobutylketone | >15 |
| Xylene | >15 |
| Resistance to | |
| 5% NaOH, 23° C | after 7 days adhesion still very good |
| 5% acetic acid, 23° C | after 7 days adhesion still very good |

We claim as our invention:

1. A random copolymer comprising:

a. 20–80 percent by weight of monomer units derived from a vinyl ester of alpha-branched, saturated, aliphatic monocarboxylic acid having five–20 carbon atoms per molecule, said units having the structural formula:

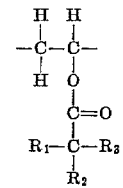

wherein $R_1$ is hydrogen or an alkyl group, and $R_2$ and $R_3$ are alkyl groups or together with the central carbon atom form a cycloalkyl group, b. 2–20 percent by weight of monomer units derived from an alpha, beta-ethylenically unsaturated carboxylic acid, said units having the structural formula:

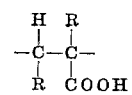

wherein each R separately is hydrogen, methyl, or a carboxyl group, c. 5–40 percent by weight of monomer units derived from a monovinyl aromatic compound, said units having the structural formula:

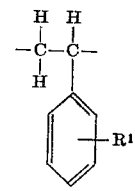

wherein $R^1$ is hydrogen or methyl, d. 5–35 percent by weight of monomer units derived from a 2-hydroxyalkyl ester of an alpha, beta-ethylenically unsaturated carboxylic acid, said units having the structural formula:

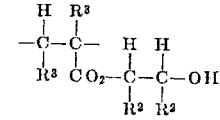

wherein each $R_2$ separately is hydrogen, methyl or ethyl, and each $R_3$ separately is hydrogen, methyl, carboxyl or 2-hydroxyalkyl, and optionally, e. 0–25 percent by weight of monomer units derived from an alkyl ester, said units having the structural formula:

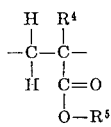

wherein $R^4$ is hydrogen or methyl, and $R^5$ is a $C_1$ to $C_4$ alkyl group, said percentages being based on the total weight of monomers used.

2. A copolymer as in claim 1, wherein component (a) is a vinyl ester of alpha-branched, saturated, aliphatic, monocarboxylic acids having from 9–11 carbon atoms per molecule.

3. A copolymer as in claim 1, wherein component (a) is a vinyl ester of an alpha-branched, saturated, aliphatic, monocarboxylic acid having 10 carbon atoms per molecule.

4. A copolymer as in claim 1, wherein component (b) is acrylic acid or methacrylic acid.

5. A copolymer as in claim 1, wherein component (c) is styrene.

6. A copolymer as in claim 1, wherein component (d) is 2-hydroxy ethyl methacrylate.

7. A copolymer as in claim 1, wherein component (e) is methyl methacrylate.

8. A copolymer as in claim 1, wherein the amount of component (a) is 40–70 percent by weight.

9. A copolymer as in claim 1, wherein the amount of components (b) and (c) is each 5–25 percent by weight.

10. A copolymer as in claim 1, comprising 40–60 percent by weight of component (a), 4–10 percent by weight of component (b), 10–30 percent by weight of component (c), 5–20 percent by weight of component (d), and 10–25 percent by weight of component (e).

11. A water-thinnable binder comprising a partially neutralized copolymer of claim 1.

* * * * *